No. 761,838. PATENTED JUNE 7, 1904.
J. H. JAMES.
SAD IRON.
APPLICATION FILED SEPT. 29, 1903.
NO MODEL.
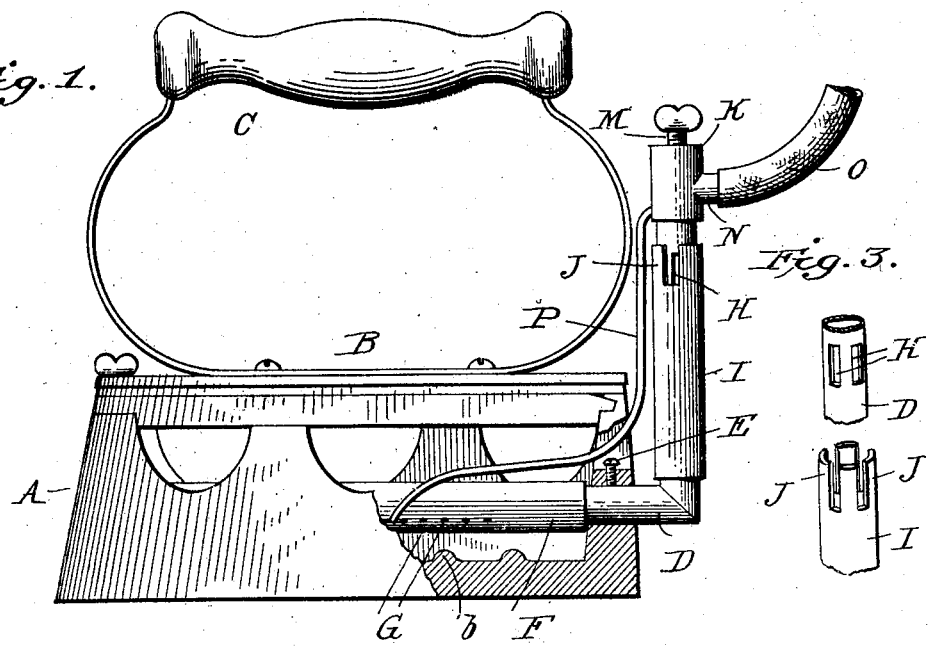
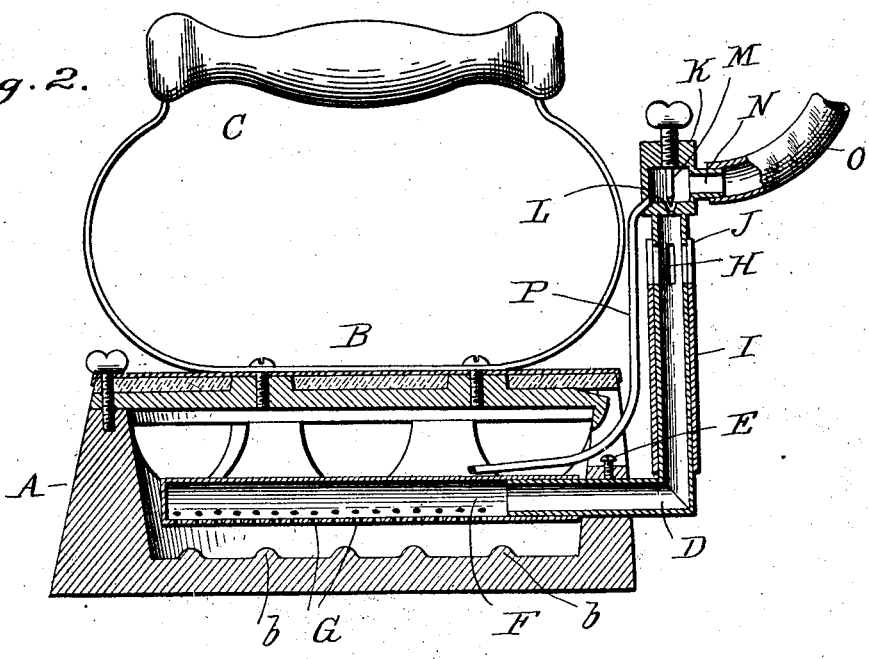
WITNESSES
Edwin L. Yewell
C. D. Davis
Joseph H. James
INVENTOR
by R. H. Bishop
Attorney No. 761,838.

Patented June 7, 1904.

UNITED STATES PATENT OFFICE.

JOSEPH H. JAMES, OF FORT SCOTT, KANSAS.

SAD-IRON.

SPECIFICATION forming part of Letters Patent No. 761,838, dated June 7, 1904.

Application filed September 29, 1903. Serial No. 175,037. (No model.)

*To all whom it may concern:*

Be it known that I, JOSEPH H. JAMES, a citizen of the United States of America, residing at Fort Scott, in the county of Bourbon and State of Kansas, have invented certain new and useful Improvements in Sad-Irons, of which the following is such a full, clear, and exact description as will enable others skilled in the art to which it appertains to make and use the same, reference being had to the accompanying drawings, forming a part hereof.

This invention has for its object the improvement and simplification of the construction of self-heating sad-irons; and it consists in certain novel features of the device illustrated in the accompanying drawings, as will be hereinafter first fully described and then particularly pointed out in the claim.

In the drawings mentioned, Figure 1 is a side elevation of my improved sad-iron with a part broken away. Fig. 2 is a longitudinal vertical section of the same; and Fig. 3 is a detailed perspective view of a portion of the burner-tube, showing the means for regulating the flow of air to the flame.

The body A of the iron is of the usual or any preferred form, and the top B, to which the handle C is secured, is attached removably thereto, as shown. The inner surface of the bottom is preferably provided with a series of projections $b$, which serve to deflect and scatter the flame, and thereby cause an even heating of the body.

Passing into the hollow body of the iron, through the rear end of the same, is a short L-shaped tube or pipe D, which is held in the iron by a set-screw E, as clearly shown. On the inner end of this tube D is fitted the burner-tube F, having a plurality of small perforations G in one side. The burner-tube is fitted on the L-shaped tube or leader D tightly enough to prevent leakage of the gas; but at the same time it may be rotated about the same, so that by removing the top B the iron may be used as a small gas-stove to heat water and for other purposes. Near the upper end of its vertical branch the leader or L-shaped tube is provided with a series of openings H, through which air may be admitted to mix with the gas, and thereby regulate the intensity of the flame. On this tube is mounted a sleeve or regulator I, having tongues J at its upper end, so that by rotating the sleeve about the tube the tongues may be brought over the openings more or less, and thereby shut off or permit the flow of air into the burner, as may be desired and as will be readily understood. On the upper end of this tube or leader D is formed or secured a box K, having a valve-opening L in its bottom, through which the gas passes into the leader on its way to the burner, and in the upper end of the box is mounted a needle-valve M, adapted to enter and close the said opening to cut off the flow of gas. The flow of gas can thus be readily regulated by adjusting the valve in or out, as will be readily understood. On one side this box is provided with a nipple N, to which is fitted the end of a hose or rubber tubing O, which is carried to and fitted on a gas-fixture or other source of fuel-supply. From another side of the box above the valve a pilot-tube P extends downward and through one of the openings in the body of the iron, terminating near the burner-tube, so as to readily ignite the gas when it is desired to use the device. This pilot-tube is lighted when the gas is first turned on and cannot be extinguished by the closing of the valve M. Consequently there is no time lost nor trouble caused by the act of lighting.

From the foregoing description, taken in connection with the accompanying drawings, it will be seen that I have provided a very simple sad-iron which can be manufactured at a slight cost. By loosening the set-screw the leader-tube is left free to be withdrawn from the body of the iron, and when it is so withdrawn it is also removed from the burner-tube. This detachability is advantageous when it is desired to pack a large number of irons in a small space.

Having thus described my invention, what I claim, and desire to secure by Letters Patent, is—

A sad-iron comprising a hollow body, a fuel-feeding tube entering the body and removably secured therein, a burner-tube mounted on the end of the fuel-feeding tube and rotatable thereon, a valve in the fuel-feeding tube, and a pilot-tube leading from the fuel-feeding tube at a point beyond the valve to the burner-tube.

In testimony whereof I have signed this specification in the presence of two subscribing witnesses.

JOSEPH H. JAMES.

Witnesses:
C. C. MYERS,
L. I. STODDAN.